C. L. BOWERS.
WHEEL LOCKING DEVICE.
APPLICATION FILED AUG. 14, 1911.
1,049,984.
Patented Jan. 7, 1913.
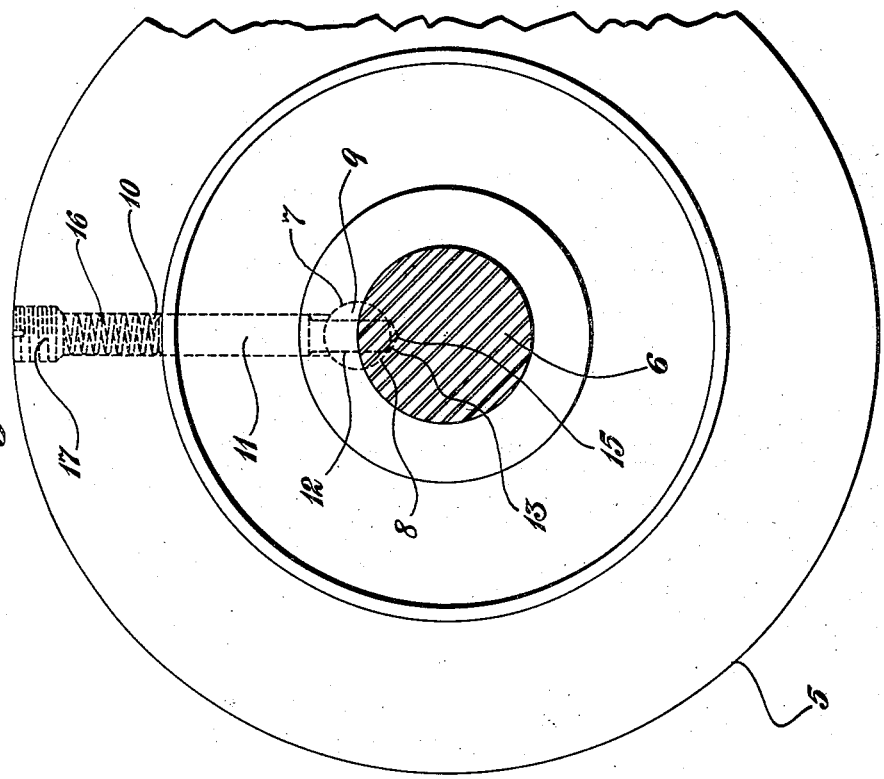
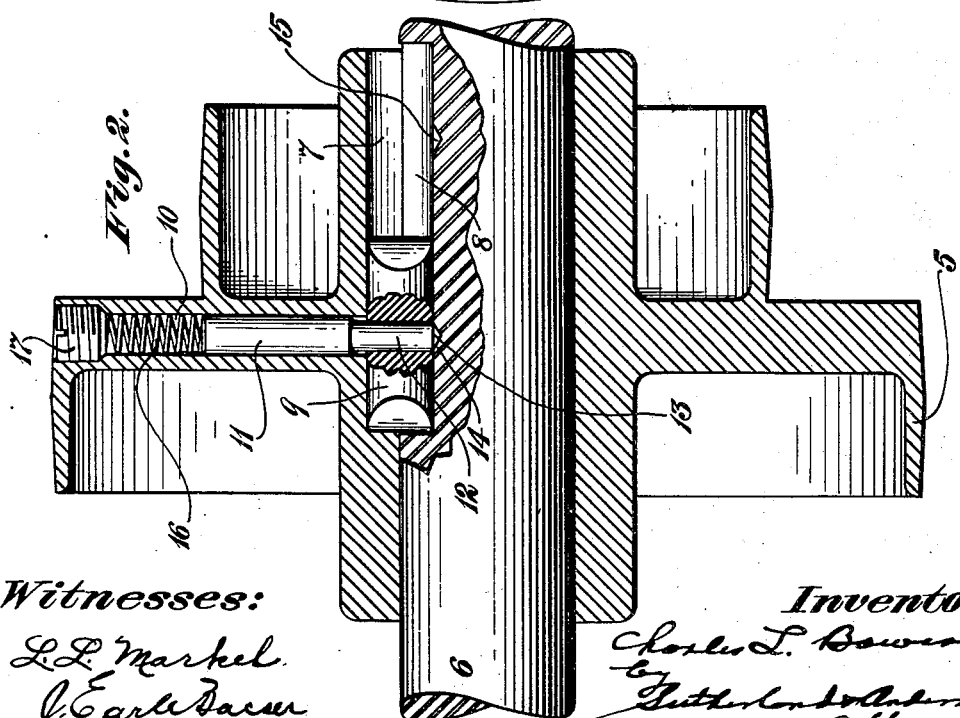
Witnesses:
Inventor:

UNITED STATES PATENT OFFICE.

CHARLES L. BOWERS, OF HARTFORD, CONNECTICUT, ASSIGNOR TO THE HENRY & WRIGHT MANUFACTURING COMPANY, OF HARTFORD, CONNECTICUT, A CORPORATION OF CONNECTICUT.

WHEEL-LOCKING DEVICE.

1,049,984.      Specification of Letters Patent.      Patented Jan. 7, 1913.

Application filed August 14, 1911. Serial No. 643,970.

*To all whom it may concern:*

Be it known that I, CHARLES L. BOWERS, a citizen of the United States, residing at Hartford, in the county of Hartford and State of Connecticut, have invented certain new and useful Improvements in Wheel-Locking Devices, of which the following is a specification.

This invention relates to what I shall for convenience term a wheel locking device, the object of the invention being to provide means of such character by which a power transmitting wheel or like part such as a pulley can be readily adjusted by hand and can be held firmly in its adjusted relation without the necessity of employing screws or equivalent parts.

In the drawings accompanying and forming part of the present specification I have shown in detail one simple form of embodiment of the invention which to enable those skilled in the art to practice the same will be set forth fully in the following description while the novelty of the invention will be included in the claims succeeding said description. From such statement it will be evident that I do not restrict myself to the showing made by said drawings and description; I may depart therefrom in several respects within the scope of my invention included in said claims.

Referring to said drawings: Figure is a side elevation of a pulley and supporting shaft, the latter being in section and the pulley being equipped with locking means involving my invention. Fig. 2 is a vertical section of the same, the shaft and certain other parts being in elevation and partly so.

Like characters refer to like parts in both figures.

It will be understood from what has already been stated locking means involving my invention can be employed with utility in different ways, for instance in connection with a pulley such as 5, the supporting shaft of which is denoted by 6. The pulley 5 is adjustable longitudinally of the shaft so that it can be positioned thereon with respect to a companion pulley either of which may be the driver. At the present time it is quite common to key a pulley to a shaft for adjustment, and it is usual to furnish a set screw carried by the pulley and adapted to engage the shaft to hold the pulley in an adjusted position. In such a case it is essential that a wrench be provided for loosening the holding screw (or screws) and subsequently setting up the same.

I provide a construction wherein the use of a screw or screws or equivalents is wholly avoided, the locking means being of such nature as to effectively hold the pulley in its adjusted position while at the same time the pulley can be freely shifted by hand. The pulley 5 interiorly thereof has a key way 7, the shaft 6 also having a key way 8, the two key ways mating to present a substantially cylindrical opening or passage adapted for the reception of a key 9. While I prefer to make the key and its seat of cylindrical shape, this is not essential. The key, of course, connects the pulley 5 to the shaft 6 for rotation therewith. The pulley 5 has a passage or bore 10 shown as extending substantially radially thereof, the outer enlarged end of the passage or bore opening into the periphery of the pulley while the inner end thereof opens into the key way 7. This passage or bore 10 serves as a convenient means for receiving a suitable locking device which may as shown consist of a pin 11 capable of sliding in the said bore. The inner portion of the locking pin 11 is circumferentially reduced as at 12 and its tip 13 constituting the locking or working portion of said pin is beveled, being in the present case pointed or approximately conical, said cone pointed end being adapted to alternately coöperate with the conical counter bores 14 and 15 formed in the bottom of the keyway 8. The locking pin or bolt 11 is normally positively urged forward preferably in some yielding manner as by the coiled spring 16, one end of which engages the butt of said pin, while the other end of which engages the screw 17 threaded into the enlarged portion of the bore 10. This screw can also be advantageously utilized for regulating the tension of the coiled push spring 16 which constantly holds the beveled end of said pin in one or the other of the two beveled counterbores or seats 14 and 15. While I have shown only two of such seats, this is not essential, the number thereof being an unimportant matter. The reduced portion 12 of the pin 11 slidingly extends through an approximately central hole in the key 9. The cone pointed end of the pin 11 is shown fitted in the seat 14, and owing to this relation, the pulley 5 will be held against accidental lateral motion or will be prevented from shifting in such direction by shocks or jars. By applying manual pressure, however, to the pulley, the same may be shifted to the right in Fig. 2, and as soon as pressure is thus applied to said pulley, the bolt or pin 11 will be retracted so that the pulley can be shifted until the cone pointed end 13 is opposite the conical counterbore 15 at which time the spring 10 will force said cone pointed end into said counterbore 15 so as to positively lock the pulley in its shifted position. The ends of the keyway 8 constitute in the present instance stops for limiting the motion of the slidable key 9, by reason of which the beveled portion 13 of the locking pin 11 will be properly or correctly presented to the two beveled seats 14 and 15. When the key 9 is against the left end wall of said keyway 8, the beveled portion 13 will be in the seat 14. When the pulley 5 is moved to the right and when the key 9 strikes the right end wall of said keyway 8 the beveled end 13 will be in register with the seat 15 so that no manipulation is necessary in order to properly enter the beveled portion of the pin in the two seats.

What I claim is:

1. The combination of a shaft, a wheel adjustable on said shaft, a key for keying the wheel to the shaft, and a yieldable locking member carried by one of the parts for holding the wheel in an adjusted position and extending through said key.

2. The combination of a shaft, a wheel adjustable on said shaft, the shaft and the wheel having mating keyways, a key fitted in the mating keyways, a locking pin, the active end of which is beveled, the shaft having several beveled seats in the keyway therein for successively receiving the beveled portion of the pin, said key having an opening for the passage of the pin, and a spring acting against the pin and tending to constantly advance the same.

3. The combination of a shaft, a wheel adjustable on said shaft, the shaft and wheel having mating keyways, a key fitted in the mating keyways, a locking pin, the wheel having a bore to slidingly receive the locking pin, said locking pin extending through said key and its active end being beveled, the keyway in the shaft having several beveled seats to successively receive the beveled portion of the locking pin, a spring in said bore acting against the pin and serving to constantly advance the same, and a set screw set in said bore and engaging the spring.

4. The combination of a shaft having a keyway, a wheel adjustable on the shaft, also having a keyway, the two keyways mating, and one of them having several beveled seats, a key to fit the mating keyways, and a yieldingly mounted locking pin carried by one of the parts and provided with a beveled portion for alternately engaging the seats, said key being movable with the pulley on the adjustment thereof and the ends of one of the keyways serving as stops to position the locking pin with respect to said seats.

In testimony whereof I affix my signature in presence of two witnesses.

CHARLES L. BOWERS.

Witnesses:
 HEATH SUTHERLAND,
 JAMES O'BRIEN.